United States Patent [19]
Keller et al.

[11] Patent Number: 5,242,755
[45] Date of Patent: Sep. 7, 1993

[54] HIGH TEMPERATURE ADHESIVE

[75] Inventors: Teddy M. Keller, Alexandria, Va.; Charles M. Roland, Waldorf, Md.

[73] Assignee: The United States of America as represented by the Secretary of the Navy, Washington, D.C.

[21] Appl. No.: 841,945

[22] Filed: Feb. 26, 1992

[51] Int. Cl.$^5$ ............................................. B32B 15/08
[52] U.S. Cl. ................................. 428/457; 427/372.2; 427/374.1
[58] Field of Search ............... 528/9, 206, 173, 99, 528/183, 360, 362, 406; 428/457; 427/372.2, 374.1

[56] References Cited

U.S. PATENT DOCUMENTS

| | | | |
|---|---|---|---|
| 4,223,123 | 9/1980 | Keller et al. | 528/9 X |
| 4,234,712 | 11/1980 | Keller et al. | 528/9 |
| 4,238,601 | 12/1980 | Keller et al. | 528/206 |
| 4,259,471 | 3/1981 | Keller et al. | 528/9 |
| 4,408,035 | 10/1983 | Keller | 528/183 |
| 4,409,382 | 10/1983 | Keller | 528/173 |
| 4,410,676 | 10/1983 | Keller | 528/9 |
| 4,619,986 | 10/1986 | Keller | 528/99 |
| 5,003,039 | 3/1991 | Keller | 528/362 |
| 5,003,078 | 3/1991 | Keller | 548/406 |
| 5,004,801 | 4/1991 | Keller et al. | 528/360 |

Primary Examiner—Thomas J. Herbert, Jr.
Attorney, Agent, or Firm—Thomas E. McDonnell; George A. Kap

[57] ABSTRACT

A substrate assembly and method for its preparation, said substrate assembly comprising at least two substrates adhesively bonded with a cured thermosetting polymer being able to withstand a temperature of 200°–400° C. which polymer is derived from a diphthalonitrile monomer and/or prepolymer with an aromatic moiety in the bridging group which monomer and/or prepolymer is solid at room temperature but which is rendered liquid by heating it to above its melting temperature. Said monomer in liquid state, and its prepolymer in liquid state, have tack with respect to said substrate.

20 Claims, No Drawings

HIGH TEMPERATURE ADHESIVE

FIELD OF INVENTION

The present invention relates to substrates bonded with a high temperature adhesive which is selected from polymers of di-phthalonitriles and to method of making articles composed of substrates bonded with said adhesive.

BACKGROUND OF INVENTION

Known high temperature adhesives have gained great popularity in the aerospace and microelectronics industries. These adhesives are used for a variety of purposes ranging from bonding substrates in aerospace industry to attaching semiconductor dies or chips to a substrate in electronics industry. One common problem associated with the known adhesives is that upon exposure to high temperatures, they exhibit a tendency to evolve gases formed during curing or post-curing of the adhesive. Evolution of gases results in void formation in the adhesive thereby adversely affecting thermal and electrical properties thereof. Other common problems of the known high temperature adhesives relate to poor processability and low glass transition temperatures. The known adhesives have poor processability in that curing thereof is accompanied by volatile formation and glass transition temperatures are too low for high temperature processing. For instance, although epoxy resins are thermosetting, they have rather low glass transition temperatures with Epon ® 825 polymer having glass transition temperature of about 140° C.

As was already mentioned, the known typical high temperature adhesives are difficult to process. Examples of such known high temperature adhesives include epoxies, polyimides, and polybenzimidazoles. The known high temperature adhesives have superior mechanical properties and are lighter and more economical to produce than metals. Epoxies cannot be used as adhesives for prolonged temperature exposure in excess of about 140° C. due to thermal and mechanical instabilities. Polyimides and polybenzimidazoles are difficult to process and volatiles are evolved during the curing or polymerization reaction.

SUMMARY OF THE INVENTION

An object of this invention is an article of manufacture composed of substrates bonded to each other with a high temperature adhesive which is a polymer of a di-phthalonitrile or a mixture of di-phthalonitriles;

Another object is an article comprising high temperature adhesive which is easily processable and which can be cured and post-cured at elevated temperatures to where its glass transition temperature is below about 550° C.;

Another object of this invention is an article comprising a high temperature adhesive which is a thermosetting polymer of one or more di-phthalonitriles which can withstand operating temperature of up to about 550° C.;

Another object of this invention is an article comprising substrates and a high temperature adhesive which does not evolve gases on curing and the substrates in the article can withstand temperatures of up to about 550° C.;

Another object is an article comprising substrates bonded together by a high temperature adhesive which adheres to the substrates and on curing and postcuring can withstand temperature of up to about 550° C.

Another object of this invention is a method of making an article composed of substrates and an adhesive bonding said substrates, said adhesive is a polymer of at least one di-phthalonitrile monomer and/or prepolymer, said method comprising the steps of providing the adhesive between the substrates and heating the adhesive above its melting point.

These and other objects can be accomplished by securing one substrate to another by means of a thermosetting polymer of at least one di-phthalonitrile which is easily processable and which polymer can withstand temperature of up to about 550° C., prefably 200° to 400° C.

DETAILED DESCRIPTION OF THE INVENTION

Phthalonitrile polymers or resins are proving to be superior in physical and chemical properties to epoxies, polyimides and other resins used as high temperature adhesives. A major advantage of phthalonitrile resins, compared to others, is their ability to withstand temperatures in excess of 300° C. for extended periods without permanent damage thereto. Such phthalonitrile resins usually contain a substantial proportion of aromatic structures, but cured polymers composed solely of aromatic rings tend to be brittle and intractable. A resin having flexible linkages between the aromatic rings minimizes or greatly reduces brittleness and intractability.

These polymers are prepared from phthalonitrile monomers in which the linking group between the two ortho dinitrile groups separates the dinitrile groups enough to permit polymerization. Presently, many bridging groups are known. Examples include aliphatic and unsaturated groups, aromatic groups, aliphatic and aromatic diamide groups, and aliphatic and aromatic ether, sulfone and ketone groups.

The chemical and physical properties of the polymers depend primarily on the bridging groups between the phthalonitrile moieties. The groups providing the best properties are those with aromatic, polar and flexible moieties, especially the —O—$\phi$—$\phi$—O—group of U.S. Pat No. 4,259,471 by Keller et al, the —O—$\phi$—C$_3$F$_6$—$\phi$—O— of U.S. Pat. 4,238,601 by Keller et al, the—O—$\phi$—C$_3$H$_6$—$\phi$—O— of U.S. Pat. No. 4,223,123 by Keller et al, the —O—$\phi$—SO$_2$—$\phi$—O— and —O—$\phi$—(C=O)—$\phi$—O— groups of U.S. Pat. 4,234,712 by Keller et al. These polymers have exceptional thermal and oxidative stability, low water absortivity, high strength, good dimensional integrity and strong adhesion. The aromatic moieties provide the high mechanical strength, modulus and high thermal and oxidative stability and the polar moieties provide the excellent adhesive properties.

The advantages of this invention are best realized in connection with polymerization of di-phthalonitrile monomers with suitable curing agents. Such monomers are represented by the following formula which can be substituted or unsubstituted:

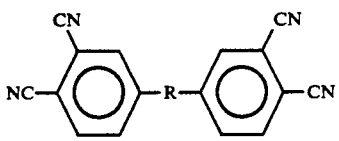

where R contains an aromatic moiety, especially phenyl group. More specifically, R is a bridge containing a bisphenol group or an —SAS— group wherein A is an aromatic or aromatic aliphatic hydrocarbon group. In a preferred embodiment, R is a bridge selected from phenylene radicals; bisphenol radicals containing no or at least one halogen substituent; diethoxy containing intermediate imide and tetravalent aromatic radicals; diethoxy of —OR'O— formula where R' is —ArC$_n$H$_{2n}$Ar—, 1 to 4 —Ar— particularly —ArAr—, —ArC$_3$F$_6$Ar—, —ArSO$_2$Ar—, and —ArCOAr—, where n is an integer of 2-30, more preferably 3-20 and Ar represents an aromatic, more preferably phenylene group. The di-phthalonitrile resins containing aliphatic bridging groups do not exhibit the required high temperature thermal and oxidative stability. It is, therefore, important that the bridging group contain an aromatic moiety.

Examples of specific di-phthalonitrile monomers described herein include 4,4'-bis(3,4-dicyanophenoxy)-biphenyl, bis(3,4dicyanophenyl)ether of bisphenol A or bisphenol S, bis(3,4-dicyanophenyl)ether of 4,4'-dihydroxybenzophenone, bisorthodinitrile of hexaflouroacetone bisphenol A, 4,4'-bis(3,4dicyanophenoxy) diphenyloxide, 2,7-bis(3,4-dicyanophenoxy)naphthalene, 1,3-bis(3,4-dicyanophenyl) oligomeric polyarylether sulfone phthalonitrile monomer, 1,3 or 1,4-bis(3,-4dicyanophenoxy)benzene, imide-containing di-phthalonitrile from 3,3', 4,4'-benzophenonetetracarboxylic dianhydride and 4-(3-aminophenoxy) phthalonitrile, 4,4'-(hexaflouroisopropylidene)diphthalic anhydride, and 4,4'-bis(3,4-dicyanothiophenoxy)biphenyl.

It appears that blends of the di-phthalonitrile monomers, prepolymers or resins when used as high temperature adhesives pursuant to the invention as described herein, are preferred to the use of a resin based on a single monomer and/or prepolymer.

The di-phthalonitrile monomers suitable herein are solids at room or ambient temperatures which can be liquified by heating them above their melting points. The phthalonitrile monomers suitable herein range in viscosity, after being liquified, from thin or watery to syrupy liquids, preferably on the order of about 1 to 10 milli Pascals.

The monomers can be synthesized in a known way. The prior art is replete with syntheses of the di-phthalonitrile monomers suitable herein.

A reduction in the viscosity of the monomers which can be polymerized to the desired adhesives can be achieved by copolymerizing the phthalonitrile monomers with other bisphenol-based phthalonitriles. The bisphenol-based phthalonitriles can behave as reactive plasticizers. As the term implies, the role of the reactive plasticizer is to improve the processability and then, through reaction with the bisphenol-based or non-bisphenol-based phthalonitriles and itself, become a part of the solid cured resin system. Blends of the phthalonitriles and bisphenol-based phthalonitriles can be fabricated without seriously comprising the use properties. The amount of bisphenol-based phthalonitrile is in the range from 5% to 50% by weight. The preferred amount is in the range from 20% to 30% by weight, with the most preferred amount being approximately 25% by weight.

A general formula of the other bisphenol-based phthalonitriles which can be used as reactive plasticizers is shown below:

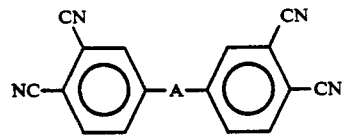

where A is any divalent organic radicals, for example, a bisphenol group, a diether group or a dithioether group.

One known method of polymerizing di-phthalonitrile monomers comprises curing or heating the monomers with metals and metal salts which act as reducing agents to promote the polymerization reaction. However, the phthalonitrile resins produced by this method are not as thermally stable as is required for many applications and there are processing problems associated with the method which are difficult to overcome. For example, a large quantity of metals or metal salts is required for complete reaction.

Another known method of polymerizing di-phthalonitrile monomers comprises curing the monomers at temperatures greater than 300° C. for in excess of several days. The curing time is unacceptably long from the commercial viewpoint.

A known improvement to accelerate the curing time, disclosed in U.S. Pat. No. 4,408,035 and 4,410,676 assigned to the United States of America as represented by the Secretary of the Navy, comprises adding a curing additive in the form of small amounts of an active hydrogen source, such as primary amines and phenols, to di-phthalonitrile monomers. For example, U.S. Pat. No. 4,408,035 discloses a method comprising curing a mixture of di-phthalonitrile monomers and a nucleophilic aromatic amine in molar ratio of monomer to amine of 40:1 at a temperature in excess of 200° C. for 24 hours and at 315° C. for a further 24 hours. The resultant phthalonitrile resin, which had melting point of 232°-234° C., had good thermal stability and a relatively high glass transition temperature (T$_g$) exceeding 200° C. The T$_g$ can be increased by postcuring at higher temperatures. When postcured at 375° C. for a short time in an inert atmosphere, the bisphenol-based di-phthalonitriles do not exhibit a T$_g$.

The curing agent suitable herein can be an amine, a phenol, or mixtures thereof and an acid or acid hydrate, or corresponding salts thereof. The salts can be prepared from the amines acting as curing adjuncts and the acids. Suitable amine or curing adjunct is selected from the group of primary amines, secondary amines, amidines, and amides. Amidines contain the radical —C:NHNH$_2$ and are derived from amides by replacement of the oxygen atom "O" by amino residue =NH or =NR. The di- compounds are of particular interest herein and contain two amidine groups. The amides are organic aromatic compounds which contain —CONH$_2$ radical.

In a preferred embodiment of this invention, the di-phthalonitrile monomers are polymerized by heating in presence of an effective amount of a suitable curing agent. These monomers can be cured to the final state or prepolymers thereof can be formed by heating the monomers only partially just before the point where gelation of the monomer mixture becomes evident. The prepolymer can be cured later at a more convenient point of the manufacture procedure to the final cured state at which point the di-phthalonitrile oligomer becomes a highly polymerized thermosetting adhesive. By curing and postcuring at elevated temperature, glass transition temperature of the di-phthalonitrile polymer can be advanced up to about 500° C. preferably up to about 400° C., and especially to within the temperature range of about 200° to 350° C.

An effective amount of the curing agent is to be used. Generally, the more curing agent that is used, the quicker is polymerization. Molar amount of the curing agent relative to the monomer is up to about 40%, preferably 0.01-20% and especially about 0.1-5%.

It is also possible to include a metal or metal salt with the monomers or polymers in amount of 1-40% by weight of the monomer, preferably 1-10%. A metal salt or a metal would be less desirable because of problems with homogeneity and gassing. Mixtures of these metals and metal salts may also be used. The preferred metals are copper, silver and iron.

A residue of the curing agent can remain after the polymer is formed. Amount of this residue is at a small or trace level since it is desired to have as little as possible of the unreacted curing agent in the polymer.

Polymerization of the monomer can involve mixing a monomer and a curing agent together following which, the curing agent promotes polymerization of the monomer at an elevated temperature. More specifically, the method involves mixing a di-phthalonitrile monomer and curing agent, curing or polymerizing the mixture at a temperature below the decomposition temperature of the resin or polymer at which temperature the mixture is molten for a time sufficient to cure or polymerize the monomer to form the resin or polymer as evidenced by increased gelation or increased viscosity.

Generally, the polymerization reaction is performed by heating the monomer to a temperature in the range from about its melting point to about its decomposition temperature. The preferred initial heating is at a temperature in the range of from about 200° C. to about 270° C. until the monomer liquifies.

Alternatively, the monomer-curing agent mixture or a mixture of the monomer and components of the curing agent between substrates can be heated to any viscosity desired by a fabricator and quenched at a stage before gelation occurs. The resulting prepolymer disposed between substrates which it adhesively secures can be stored indefinitely at room temperature without further reaction. When needed, the prepolymer can be processed above the glass transition temperature, which has been greatly suppressed relative to the original melting point of the monomer. The cure and postcure cycles for the prepolymer would be the same as those for the di-phthalonitrile polymers. The stability of the prepolymer at ambient temperature is particularly appealing for the use thereof as high temperature adhesive.

A prepolymer is a polymer because it contains two or more repeating units. A prepolymer or oligomer or B-stage polymer can be cooled to a solid state, pulverized to a powder and kept in powder form until its use. The prepolymer can also be formed and stored in sheet form. The prepolymer can be used as a high temperature adhesive by applying it in powdered or sheet form to a substrate and subsequently heating it above its melting temperature to cure it and, if desired, to postcure same to improve its mechanical properties. A prepolymer is thermoplastic of defined glass transition temperature which can become thermosetting after the cure or the postcure.

Curing and post-curing of the di-phthalonitrile polymers can be carried out at elevated temperatures of up to about 500° C. for duration of up to about a couple of days. In a preferred embodiment, curing and post-curing can be effected by heating di-phthalonitriles for 1-28 hours at 250°-450° C. or until the desired glass transition temperature of the di-phthalonitrile resin is attained, followed by cooling to room or ambient temperature. After the polymer is cured, a postcure can be carried out to improve the mechanical and thermal properties thereof. The preferred postcure is at 325°-365° C. for 2-6 hours and at 365°-385° C. for 5-24 hours. The most preferred postcure is at 350° C. for 4 hours and at 375° C. for 12 hours. When postcure temperatures are in excess of 300° C., heating should be conducted under an inert atmosphere, such as nitrogen or argon.

The substrates and/or laminates which can be bonded by the high temperature adhesives described herein can be metallic or nonmetallic but the substrates have to be able to withstand the elevated melting, curing and post-curing temperatures disclosed herein. Substrates of different materials can be bonded with the herein-described high temperature adhesives. The high temperature adhesives described herein can be used to impregnate fibers, such as glass fibers, and then secure the fibers to a substrate or between a pair of substrates. The preferred substrates include metallic, ceramic, and high temperature plastics. Specific examples of preferred substrates include steel, aluminum, titanium, brass and bronze. Brass is an alloy consisting essentially of copper and zinc in variable proportions whereas bronze is an alloy of copper and tin and sometimes other elements.

A substrate, as used herein, is any component which can be bonded to another substrate by means of the high temperature adhesive described herein. When the adhesive is on or between substrates and it is desired to cure the adhesive to its final thermosetting stage or to a thermoplastic prepolymer stage, the substrate or substrates, or portions thereof, are heated to the temperatures at which the prepolymer or the cured adhesive are produced. For this reason, the substrates must be able to withstand the elevated temperature.

The di-phthalonitrile adhesives described herein in solid form disposed between substrates have thickness on the order of about 50-100 microns. The di-phthalonitrile adhesives described herein have good tack when in liquid state and can adhere to the substrates without any surface treatment of the adhesives. However, to improve the tack between the di-phthalonitrile adhesives and the substrates, bonding surfaces of the substrates can be prepared. The bonding surfaces of the substrates can be prepared by cleaning the surfaces with an appropriate solvent or by roughening the surfaces, as with sandpaper or in some other known way. No primer is needed.

In preparing a substrate assembly, the di-phthalonitrile monomer is heated until it becomes liquid and then it is applied to a surface of a first substrate by spraying or brushing or in some other way. The liquid monomers on the substrate can be cured to a prepolymer stage and then cooled and stored or another substrate having an adhesive layer of the di-phthalonitrile monomer or prepolymer or devoid thereof is adhered to the first treated substrate. The pair of substrates so adhesively joined can then be lightly pressed with a pressure on the order of about 5-15 Pascals to remove any excess adhesive and degassed to remove any trapped gas. The pressure will vary depending if more than two substrates are pressed together. The adhesive is then cured by subjecting the entire assembly to elevated temperature until the desired cure or the desired glass transition temperature of the adhesive is achieved.

The monomer or prepolymer in liquid state can be applied to a substrate and a pair of such substrates can be joined with the monomer or prepolymer between the substrates. Polymerization of the adhesive can be advanced from the monomer to the prepolymer stage by heating at an elevated temperature, as is well known in the art, and then storing the adhesively adhered substrates at ambient temperature until the desired time. At the desired time, the prepolymer adhesive between the substrates can be cured to the final thermosetting stage by heating at an elevated temperature.

It is also possible to achieve the desired objectives in a different way. The monomer can be liquified, formed into thin adhesive sheets and cooled while in the prepolymer stage. The prepolymer adhesive sheets in solidified form can be placed between substrates to be adhesively bonded and heated to liquify the adhesive sheet. Since a prepolymer has glass transition temperature of about 80°-90° C., it does not require much heat to liquify it. The substrate assembly can be place in a vacuum oven to equilibrate the molten prepolymer in the melt state and the adhesive can be degassed, if it was felt necessary to do so. The substrate assembly can also be pressed to remove excess adhesive and the adhesive can be cured by heating at an elevated temperature.

The prepolymer in solid form, or a solid monomer, or a solid but thermoplastic polymer, can be powdered and used as the adhesive to bind substrates together. The powdered adhesive can then be applied to substrates and cured or post-cured to the desired state in which the adhesive would bind the substrates securely.

The present invention is further illustrated by the following examples which demonstrate preparation of adhesively bonded substrates using the high temperature di-phthalonitrile adhesive described herein.

EXAMPLE 1

This example demonstrates preparation of a prepolymer adhesive from a di-phthalonitrile monomer and an aromatic amine curing agent. The monomer was 4,4'-bis(3,4-dicyanophenoxy)biphenyl and the curing agent was 1,3-bis(3-aminophenoxy)benzene.

50 grams of the di-phthalonitrile monomer was weighed into an aluminum planchet, melted, and degassed at 240° C. for 4 hours at reduced pressure. To the melt at 240° C. was added with stirring 0.75 gram or 1.5% by weight of the amine curing agent. The mixture was held at 240° C. for 15 minutes and then quenched back to room temperature of about 20° C. This amorphous prepolymer, which is stable indefinitely at room temperature, was used as the adhesive in subsequent experiments.

EXAMPLE 2

The metal substrates used in the examples were steel, aluminum, brass, and titanium.

The surfaces of aluminum, brass and stainless steel substrates were prepared in the same manner. This included sanding a 1" wide surface on each substrate with a 400 grit sandpaper by hand and then washing clean with hexane. This was followed by sanding with a 1200 grit sandpaper and then cleaning by washing with hexane.

The titanium substrates were abraded with a file and further cleaned using either Pasa Jell treatment or scotchbrite-type sandpaper. Pasa Jell is a blend of mineral acids, activators and inhibitors. The approximate chemical compositions of Pasa Jell is 40% nitric acid, 10% combined fluorides, 10% chromic acid, 1% couplers, and balance water. For cleaning titanium surfaces, the Pasa Jell blend was diluted with 50% water. The titanium surfaces were cleaned with the Pasa Jell mixture, rinsed with deionized water, and dried in air.

EXAMPLE 3

This example describes preparation of adhesively bonded metal substrates with the adhesive of Ex. 1 and the determination of shear strength thereof.

The phthalonitrile prepolymer adhesive prepared in Ex. 1 was first liquified at 240° C. and then painted with a brush onto the cleaned surfaces on the substrates set off ½" back from the edge. Thickness of the adhesive on the substrates was about 1-2 mils. Two substrates of the same metal having the adhesive thereon were united adhesive side to adhesive side and then placed on a hot plate at 250° C. and allowed to equilibrate in the melt state. This was followed by placing heavy stainless steel plates on top of the adhesively bonded substrates to squeeze out excess adhesive. Other substrate samples were prepared in the same way. At this stage, all substrate samples were cooled to the room temperature of about 20° C. The substrate samples were then placed in a preheated oven and were degassed at 250° C. over a period of 30 minutes and then cured in accordance with the following approximate schedule: overnight (12-18) hours at 240° C., 8 hours at 280° C., and overnight (16-24) hours at 315° C. Some substrate samples were postcured for 4 at 350° C. to determine the effect of additional curing on the shear strength. Certain of the titanium substrate samples were prepared with a scrim (fiber-glass cloth) impregnated with the adhesive of Ex. 1 disposed between a pair of opposing titanium substrates or plates. Shear strength values were obtained on substrate samples at room temperature (RT) of about 20° C. and at 200° C. The shear strength values are given in Table 1, below, wherein shear strength is given in lbs/in (pounds per inch) and the number in parentheses indicates the number of substrate samples tested:

TABLE 1

| Adherend | Shear Strength (lbs/in) | | | |
|---|---|---|---|---|
| | RT | | 200° C. | |
| aluminum[1] | (7) | 1450 | (6) | 1070 |
| brass[1] | (6) | 1860 | (7) | 1450 |
| steel[1] | (2) | 1940 | | — |
| steel[2] (standard) | (2) | 1610 | | — |
| titanium[3] | (5) | 1480 | | — |
| titanium[4] | (6) | 2218 | | — |
| titanium[5] | (4) | 1250 | | — |

| | Shear Strength (lbs/in) | |
|---|---|---|
| Adherend | RT | 200° C. |
| aluminum[6] (standard) | (2) 0 | — |

[1] Cure cycle was 240° C. for 16-18 hours, 280° C. for 8 hours, and 315° C. for 16 hours.
[2] Epon ®828 cured with 14.5 pph of m-phenylenediamine curing agent at 75° C. for 2 hours and at 125° C. for 2 hours. The literature value for the shear strength of Epon 828 is 7500 lbs/in. Thus the measured shear strength values for the cured phthalonitrile resin adhesive are probably too low.
[3] Cure cycle was 240° C. for 16 hours, 280° C. for 6 hours, and 315° C. for 16 hours. The substrate sample surface preparation was by filing followed by Pasa Jell treatment. Scrim was used to control thickness.
[4] Cure cycle was 240° C. for 16 hours, 280° C. for 6 hours, and 315° C. for 16 hours. The substrate sample surface preparation was by filing followed by scotchbrite-type sandpaper hand rub. No scrim was used here.
[5] Cure cycle was 240° C. for 16 hours, 280° C. for 6 hours, and 315° C. for 16 hours and postcured at 350° C. for 4 hours. The substrate sample surface preparation was by filing followed by scotchbrite-type sandpaper hand rub. No scrim was used here.
[6] Exactly as in (2) followed by exposure to 240° C. for 16 hours.

Results in Table I demonstrate that the adhesive bonds survive exposure to above 300° C. for 16 hours as evidenced by subsequent room temperature (RT) shear testing which resulted in cohesive failure of the resin at high levels of shear stress, see Table I. Cohesive failure is failure within the adhesive itself and is not failure at the interface with the adherend or substrate. When the standard adhesive (epoxy) was exposed to 240° C. for about 16 hours, the shear adhesion subsequently measured was immeasurably low at room temperature. Notwithstanding that measurements at above 200° C. are absent, the data in Table I demonstrates that the adhesives of this invention perform to at least 315° C.

What is claimed is:

1. Article comprising substrates and a thermosetting adhesive between said substrates adhesively bonding said substrates, said adhesive is a polymer of a monomer or a mixture thereof selected from the group consisting essentially of monomers represented by the following structural formula:

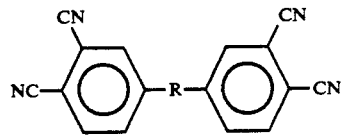

wherein R in said monomer is selected from phenylene radicals; —SAS— radicals wherein S is a sulfur atom and A is an aromatic or aromatic aliphatic hydrocarbon group; bisphenol radicals containing no or at least one halogen substituant; diethoxy containing intermediate imide and tetravalent aromatic radicals; diethoxy of the formula —OR'O— where R' is selected from —ArC$_n$H$_{2n}$Ar—, 1 to 4 —Ar—, —ArC$_3$F$_6$Ar—, —ArSO$_2$Ar—, —ArCOAr—, and mixtures thereof, where n is an integer from 2-30 and Ar represents an aromatic group.

2. Article of claim 1 wherein Ar represents a phenylene group.

3. Article of claim 1 wherein said polymer can withstand temperature in the range of about 200° to 400° C. and said substrates are selected from metals, nonmetals, and mixtures thereof which can withstand at least about 200° C. without deterioration.

4. Article of claim 1 wherein R in said monomer is selected from phenylene radicals, bisphenol radicals containing no or at least one halogen substituent; diethoxy containing intermediate imide and tetravalent aromatic radicals; diethoxy of the formula —OR'O— where R' is selected from —ArC$_n$H$_{2n}$Ar—, 1 to 4 —Ar—, —ArC$_3$F$_6$Ar—, —ArSO$_2$Ar—, —ArCOAr—, and mixtures thereof, where n is an integer from 3-20, and Ar represents a phenylene group.

5. Article of claim 4 wherein said monomer is a solid at room temperature but which becomes a liquid at elevated temperatures and said substrates are selected from steel, aluminum, titanium, brass, bronze, and mixtures thereof.

6. Article of claim 4 wherein said polymer is prepolymer.

7. Article of claim 4 wherein said polymer has glass transition temperature of about 80°–90° C.

8. Article of claim 1 wherein said monomer is selected from 4,4'-bis(3,4-dicyanophenoxy)biphenyl, bis(3,4-dicyanophenyl)ether of bisphenol A or biphenol S, bis(3,4-dicyanophenyl)ether of 4,4'-dihydroxybenzophenone, bisorthodinitrile of hexaflouroacetone bisphenol A, 4,4'-bis(3,4-dicyanophenoxy)diphenyloxide, 2,7-bis(3,4-dicyanophenoxy)naphthalene, 1,3-bis(3,4-dicyanophenyl) oligomeric polyarylether sulfone phtholnitrile monomer, 1,3 or 1,4-bis(3,4-dicyanophenoxy)benzene, imide-containing di-phthalonitrile from 3,3',4,4'-benzophenonetetracarboxylic dianhydride and 4-(3-aminophenoxy)phthalonitrile, 4,4'-(hexaflouroisopropylidene) diphthalic anhydride, 4,4'-bis(3,4-dicyanothiophenoxy)biphenyl and mixtures thereof.

9. Article of claim 8 wherein said substrate is selected from steel, aluminum, titanium, brass, and bronze.

10. Article of claim 9 wherein said polymer has glass transition temperature in the range of 200°–350° C.

11. Method of making an article composed of substrates and an adhesive bonding the substrates, said method comprises the steps of providing the adhesive between the substrates and heating the adhesive at a temperature above melting temperature of the adhesive, the adhesive is a polymer of a monomer or a mixture thereof or a prepolymer of the monomer or a mixture thereof, the monomer is represented by the following structure formula:

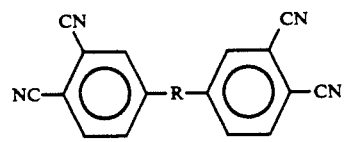

wherein said monomer and said prepolymer are thermoplastic and wherein R in said monomer is selected from phenylene radicals; —SAS— radicals wherein S is a sulfur atom and A is an aromatic or aromatic aliphatic hydrocarbon group; bisphenol radicals containing no or at least one halogen substituent; diethoxy containing intermediate imide and tetravalent aromatic radicals; diethoxy of the formula —OR'O— where R' is selected from —ArC$_n$H$_{2n}$Ar—, 1 to 4 —Ar—, —ArC$_3$F$_6$Ar—, —ArSO$_2$Ar—, —ArCOAr—, and mixtures thereof, where n is an integer from 2-30 and Ar represents an aromatic group.

12. Method of claim 11 wherein Ar represents a phenylene group and wherein said adhesive is a powder when it is provided between said substrates before said heating step.

13. Method of claim 12 wherein said polymer can withstand temperature in the range of about 200° to 400° C. and said substrates are selected from metals, nonmetals, and mixtures thereof which can withstand at least about 200° C. without deterioration.

14. Method of claim 11 wherein said monomer in molten state has viscosity in the range of about 1 to 10 milli Pascals at 240° C. and wherein R in said monomer is selected from phenylene radicals, bisphenol radicals containing no or at least one halogen substituent; diethoxy containing intermediate imide and tetravalent aromatic radicals; diethoxy of the formula —OR'O— where R' is selected from —ArC$_n$H$_{2n}$Ar—, 1 to 4 —Ar—, —ArC$_3$F$_6$Ar—, —ArSO$_2$Ar—, —ArCOAr—, and mixtures thereof, where n is an integer from 3-20, and Ar represents a phenylene group.

15. Method of claim 14 wherein said adhesive is in liquid form when it is provided between said substrates, wherein thickness of said adhesive in solid form is on the order of about 50 to 100 microns and said substrates are selected from steel, aluminum, titanium, brass, bronze and mixtures thereof.

16. Method of claim 11 wherein said adhesive is thermosetting following said heating step and wherein said monomer is selected from 4,4'-bis(3,4-dicyanophenoxy)biphenyl, bis(3,4-dicyanophenyl)ether of bisphenol A or biphenol S, bis(3,4-dicyanophenyl)ether of 4,4'-dihydroxybenzophenone, bisorthodinitrile of hexaflouroacetone bisphenol A, 4,4'-bis(3,4-dicyanophenoxy)diphenyloxide, 2,7-bis(3,4-dicyanophenoxy)naphthalene, 1,3-bis(3,4-dicyanophenyl) oligomeric polyarylether sulfone phtholnitrile monomer, 1,3 or 1,4-bis(3,4-dicyanophenoxy)benzene, imide-containing diphthalonitrile from 3,3',4,4'-benzophenonetetracarboxylic dianhydride and 4-(3-aminophenoxy)phthalonitrile, 4,4'-(hexaflouroisopropylidene) diphthalic anhydride, 4,4'-bis(3,4-dicyanothiophenoxy)biphenyl and mixtures thereof.

17. Method of claim 16 wherein said heating step is carried out for 1-28 hours at 150°-450° C., followed by cooling to ambient temperature.

18. Method of claim 17 wherein said polymer has glass transition temperature in the range of 200°-350° C.

19. Method of claim 16 wherein said heating step is carried out for 1-28 hours at 250°-450° C. and wherein said adhesive and said substrates are subjected to said heating step.

20. Method of claim 19 wherein said heating step includes heating said polymer in an inert atmosphere at 325° to 365° C. for 2 to 6 hours, the adhesive is a solid having thickness on the order of about 50 to 100 microns, and said method includes the step of pressing the substrates at a pressure on the order of about 5 to 15 Pascals per two substrates.

* * * * *